Nov. 20, 1923.

C. J. H. PENNING 1,474,549

INTERNAL COMBUSTION ENGINE

Filed June 15, 1923 10 Sheets-Sheet 1

Inventor
C.J.H.Penning
Atty

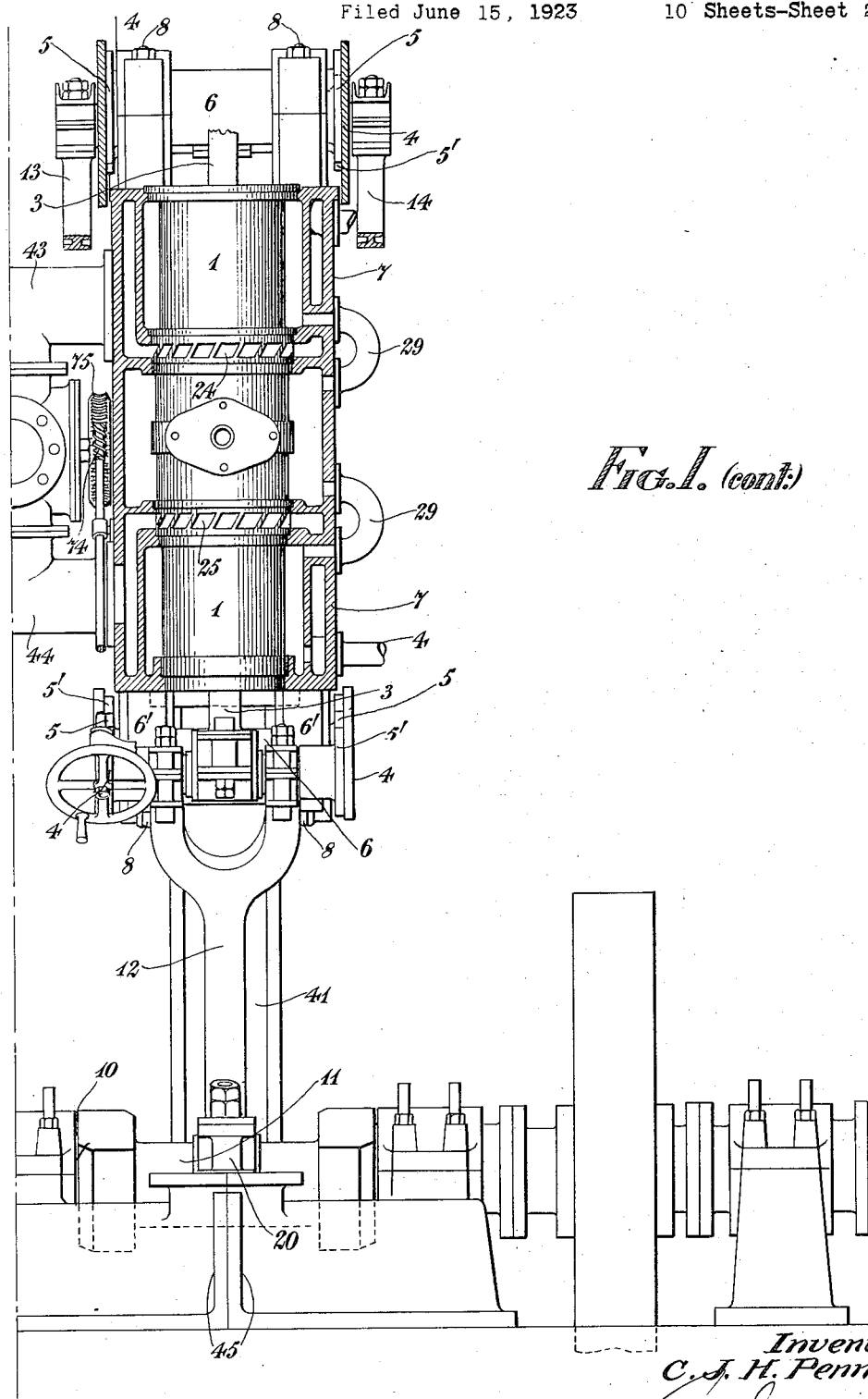
Fig. I. (cont.)

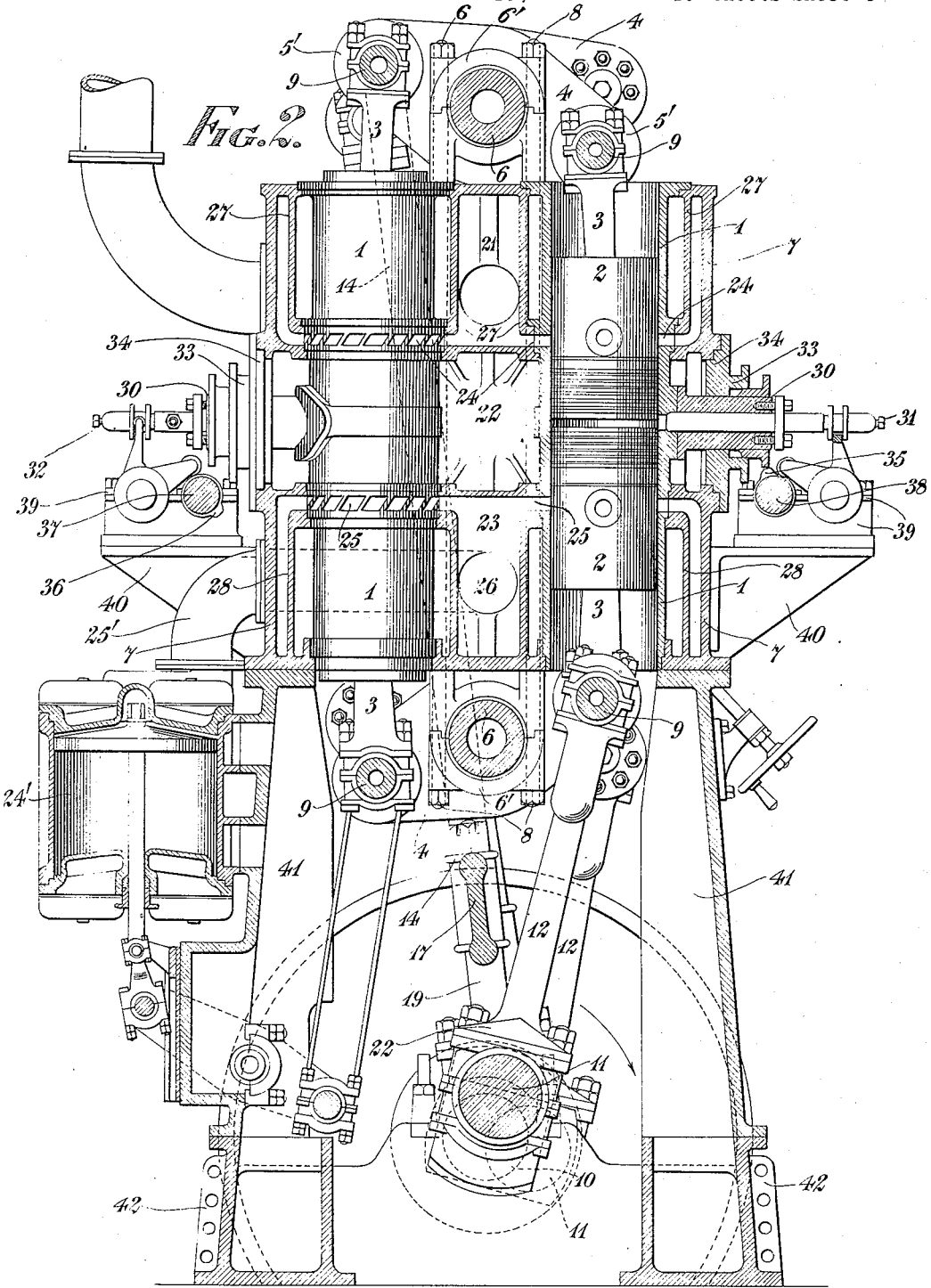

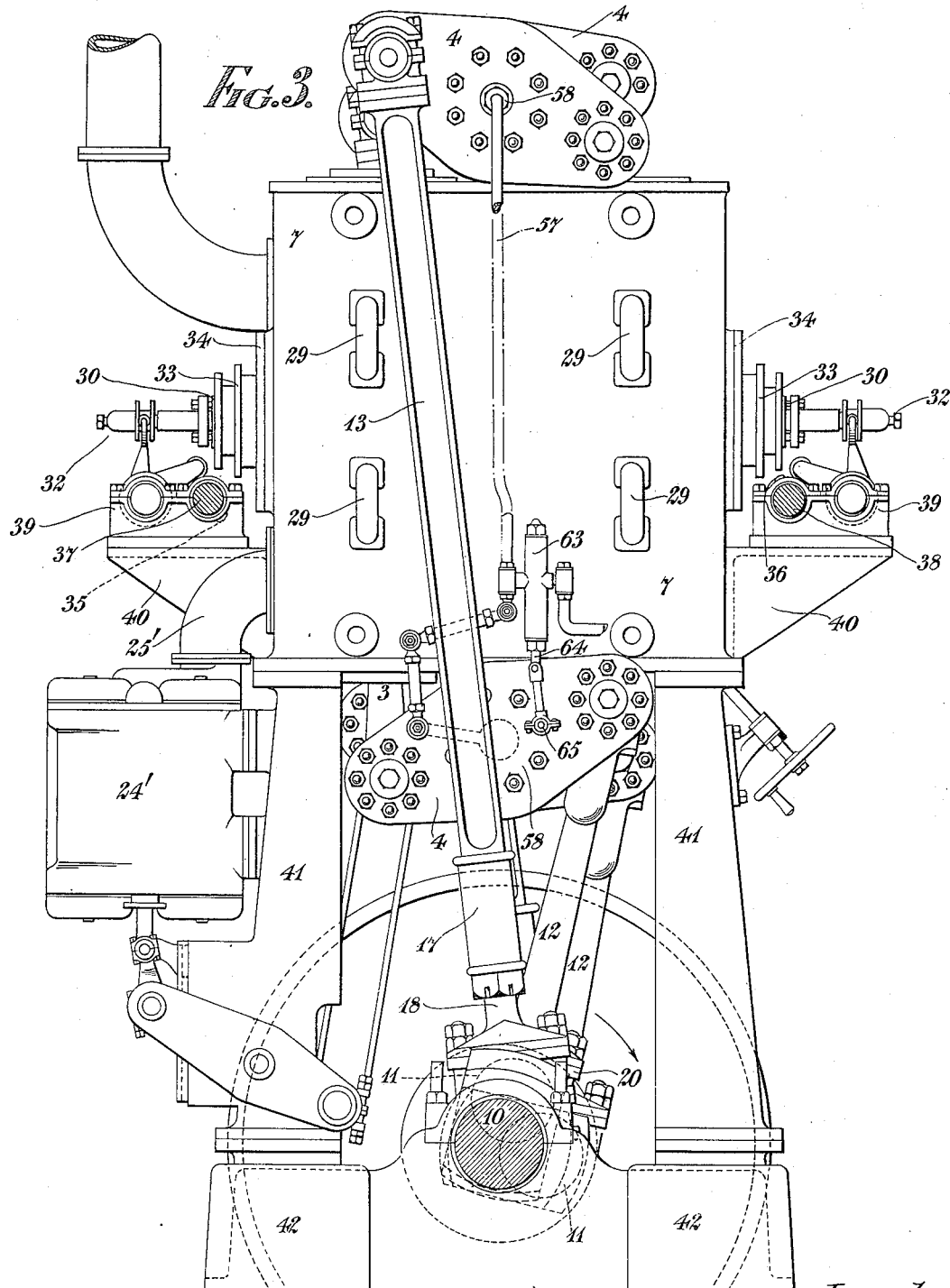

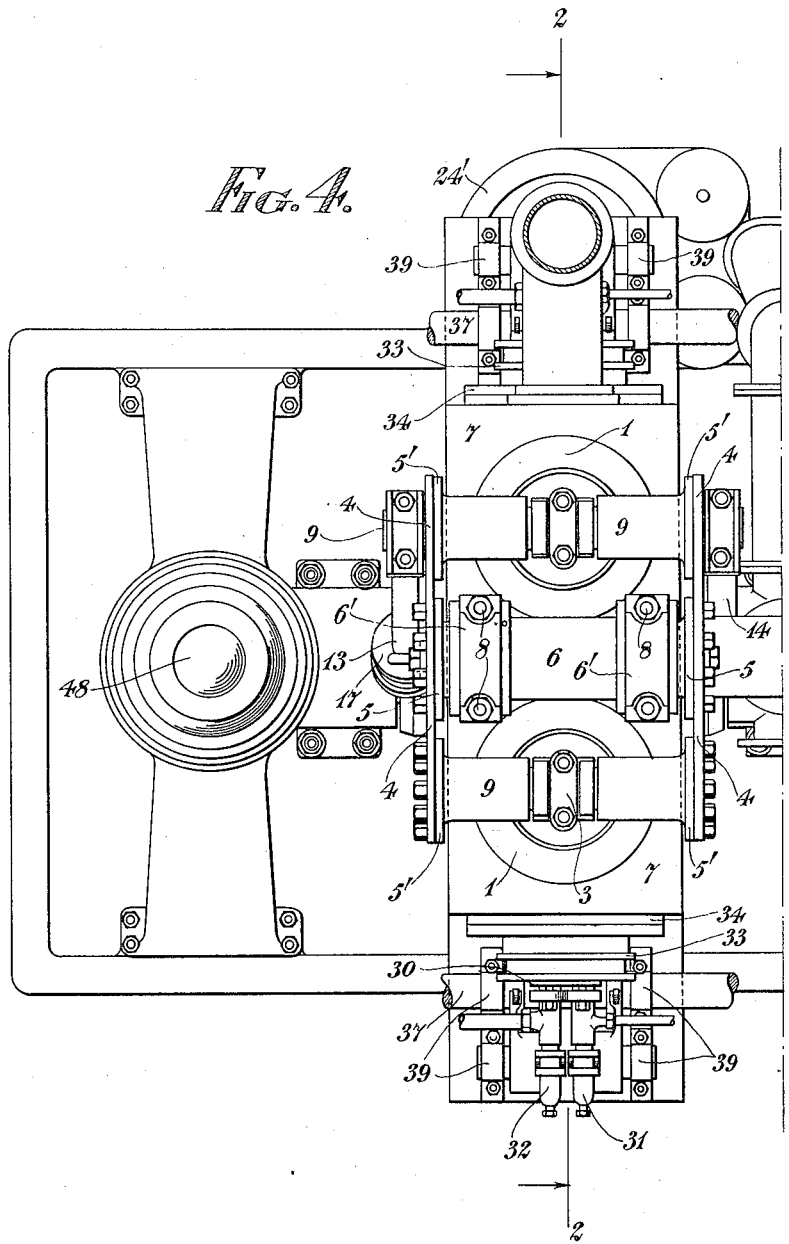

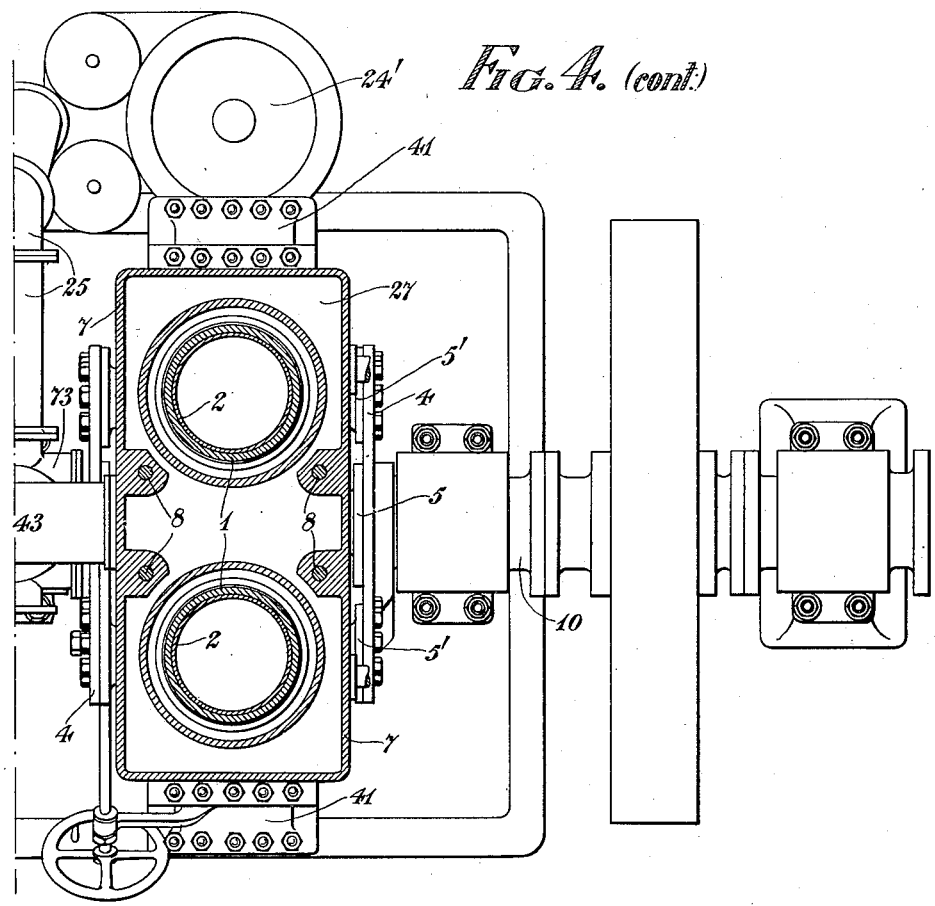

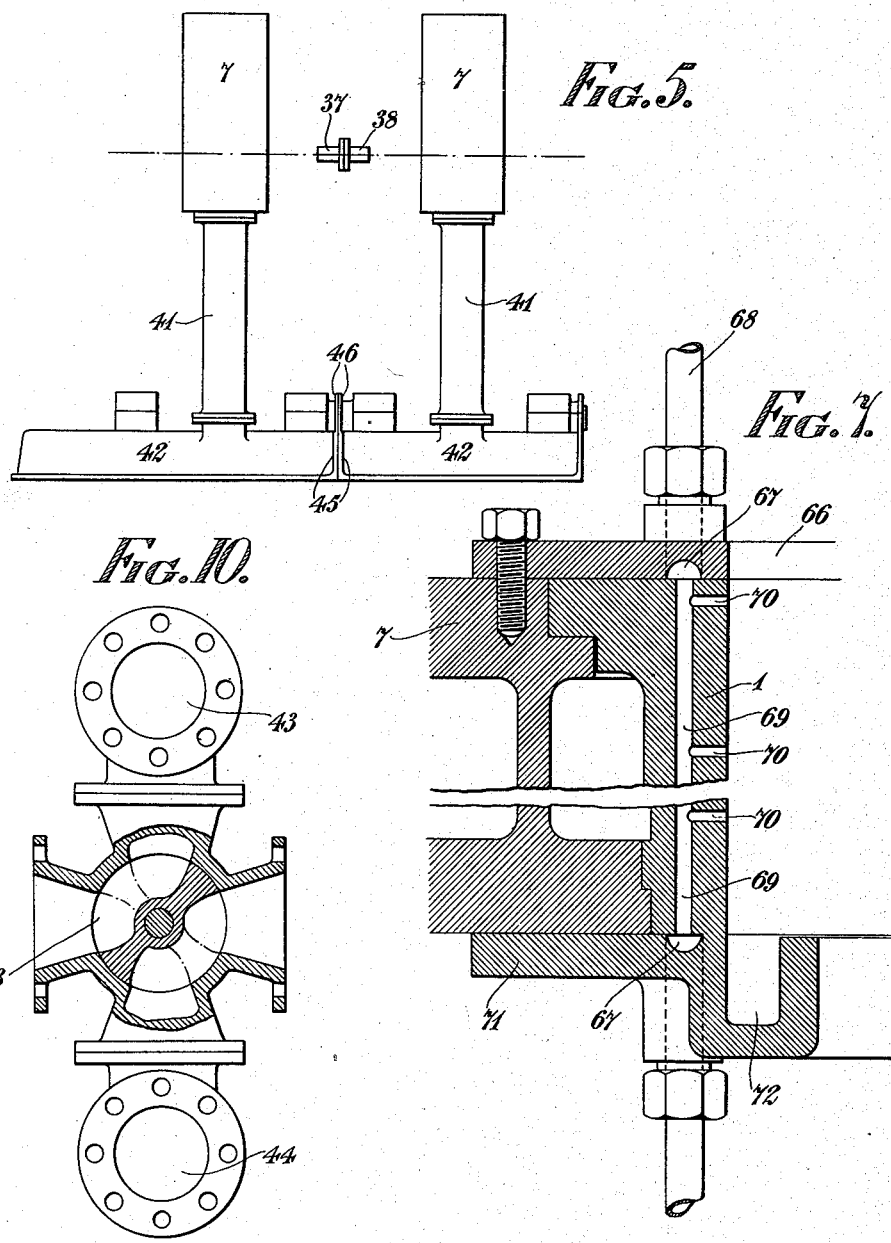

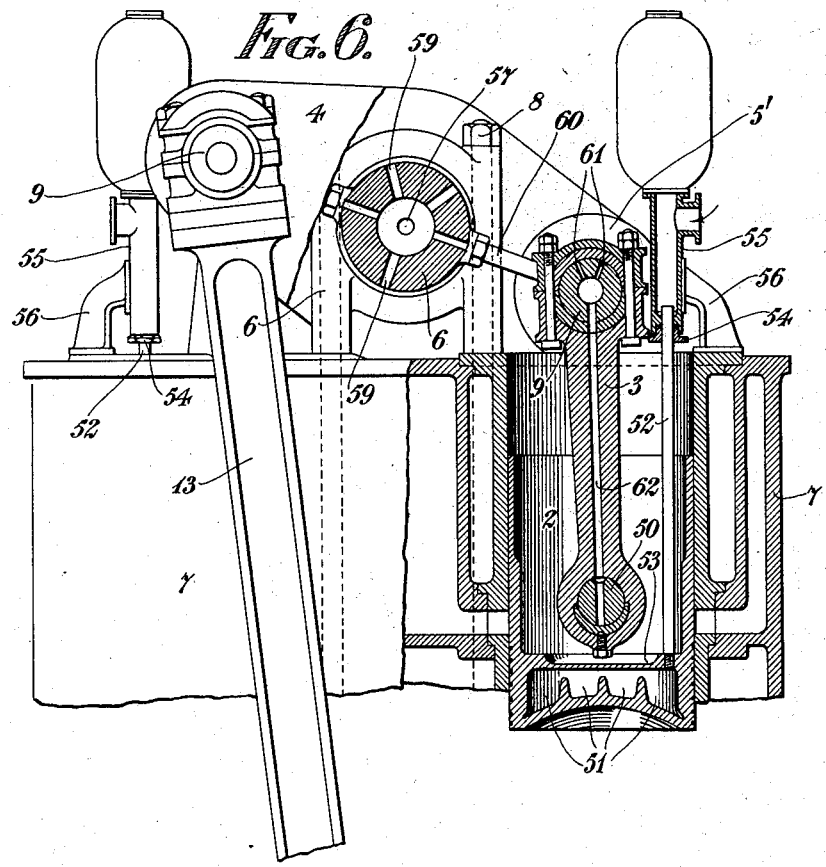

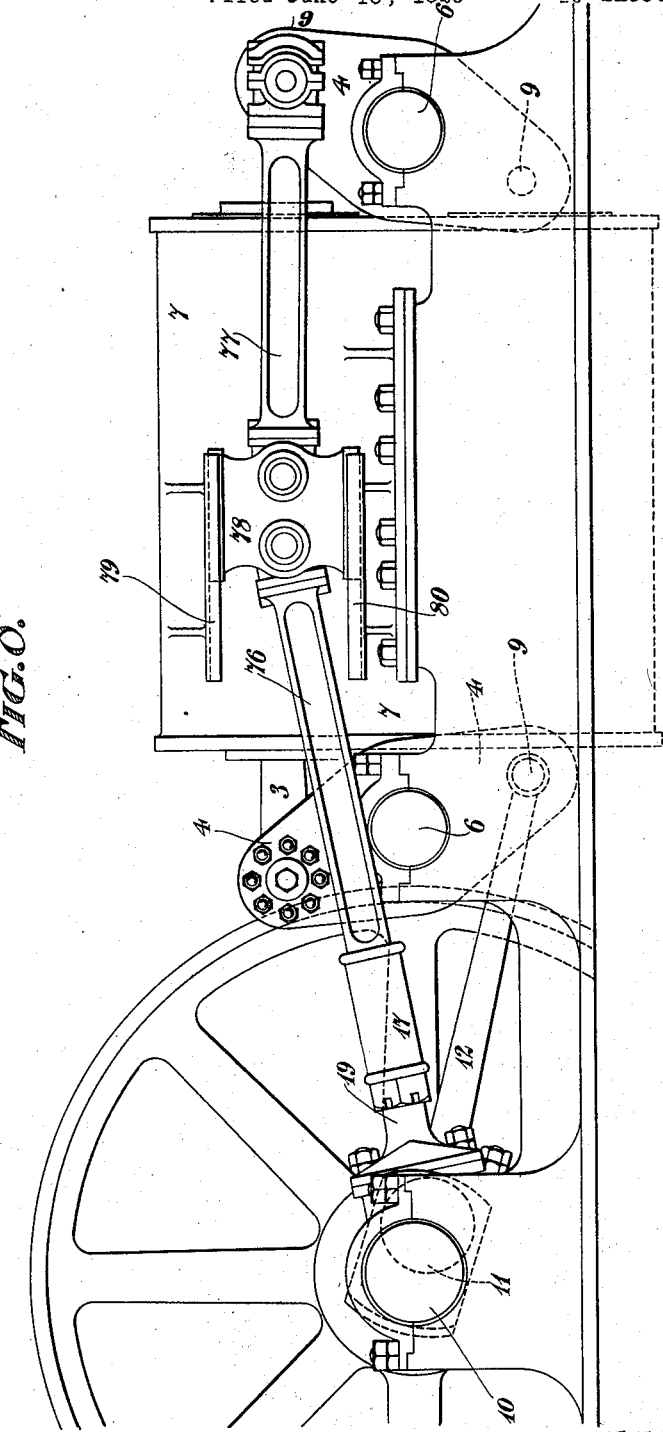

Nov. 20, 1923.

C. J. H. PENNING

INTERNAL COMBUSTION ENGINE

Filed June 15, 1923   10 Sheets-Sheet 10

1,474,549

Inventor
C. J. H. Penning
Atty

Patented Nov. 20, 1923.

1,474,549

UNITED STATES PATENT OFFICE.

CORNELIS J. H. PENNING, OF LONDON, ENGLAND.

INTERNAL-COMBUSTION ENGINE.

Application filed June 15, 1923. Serial No. 645,686.

*To all whom it may concern:*

Be it known that I, CORNELIS JOANNES HUGO PENNING, a subject of the Queen of the Netherlands, residing at 3 Addison Court Gardens, Kensington, London, in the Kingdom of England, have invented certain new and useful Improvements in or Relating to Internal-Combustion Engines, of which the following is a specification.

This invention relates to internal combustion engines or explosion motors of the two-stroke type and has for its object to provide an improved construction of internal combustion engine or explosion motor which renders the construction of large engines more practical, especially internal combustion engines comprising multiple units. The present invention relates more particularly to that type of internal combustion engine employing oppositely acting pistons in a common cylinder with common working space, the said pistons driving a crank shaft through a pair of rockable arms belonging to the pistons of a pair of cylinders.

As heretofore the engine comprises a pair or more than one pair of cylinders disposed parallel and at right angles to the crank shaft, each cylinder being provided with oppositely acting pistons connected to rocker arms, the movement of the rocker arms, according to the present invention, being transmitted therefrom to a crank shaft disposed between and below or to the side of the pair or pairs of cylinders by connecting rods of unequal length directly or indirectly connected or coupled to a crank pin or to crank pins on the same crank shaft.

The rocker arms may be constructed of plate steel or other suitable material which are preferably bolted or riveted to flanges on the rocker arm shaft. The gudgeon pins to which the piston connecting rods are connected are also provided with flanges to which the rocker arms are bolted or riveted. There are thus two sets of rocker arms, an outer set and an inner set, the inner set being on the crank shaft side of a pair of cylinders and the outer set being arranged beyond or above a pair of cylinders. It will thus be understood that the movement of the inner rocker arm is transmitted direct to the crank pin and consequently to the crank shaft by a connecting rod, the small end of which is connected to the gudgeon pin of the said rocker arm, the large end of the connecting rod being directly or indirectly coupled to the crank pin. One of the gudgeon pins of the outer rocker arm is extended at either end or both ends outside the rocker bearing and this extension or these extensions is or are directly connected to the crank pin or crank pins by means of a connecting rod or connecting rods longer than the first connecting rod. The longer connecting rod may be formed in two or more parts interconnected by a yoke member common to both parts of the long connecting rod and disposed crosswise and practically parallel to the crank shaft axis. If so desired each set of connecting rods may comprise only one rod but in order to facilitate the working of the engine and to provide a more or less balanced construction the long connecting rod is preferably in duplicate, two connecting rods connecting extensions on each end of a rocker gudgeon pin to the yoke member, to which yoke member a big end or big ends is or are connected, engaging the crank pin. To avoid in large engines the excessive length of the long connecting rod or rods or of those parts of the long connecting rod connecting the extensions of the rocker gudgeon pin to the yoke member as hereinbefore described, the connecting rod or rods or the said parts thereof can be made in two pieces linked together to a common crosshead or crossheads which crosshead or crossheads is or are adapted to reciprocate between guides integral with or secured to the cylinder casing or engine bed plate.

It should be clearly understood that the use of the yoke member common to both the connecting rods of one set is not essential because these connecting rods may each be in one continuous piece instead of being formed in parts. The aforesaid arrangement of yoke provides, however, for a light and cheap construction especially of the crank shaft.

The cylinders, preferably comprise a rectangular casting in which are arranged loose liners to form the working surface for the pistons, the rectangular casting being hereinafter referred to as the cylinder casing. This casing is preferably divided into three chambers or compartments by horizontal partitions, the upper chamber or compartment serving as an exhaust or air chamber common to the adjacent ends of a pair of cylinders, and the lower compartment forming a scavenging air or exhaust chamber common to the corresponding or lower ends of a pair of cylinders. Whether the upper or the lower compartment is the common exhaust chamber or the common air chamber depends on the direction of turning of the engine. Suitable ports cut in the walls of the liners make communication from the cylinder liner to the common exhaust and scavenging air chamber. It is proposed to make these ports consist of a multiple of small holes drilled in the circumference of the cylinder liners. The central chamber or compartment forms a water jacket surrounding the combustion space of a pair of cylinders, the said combustion space being arranged between the pistons of the respective pair or pairs of cylinders. The scavenging air is supplied from an air pump or blower connected by suitable piping to the chamber or compartment which forms the common air chamber. The parts of the cylinder liners situated in the upper chamber or compartment and lower chamber or compartment are preferably surrounded by water jackets, these jackets being in connection by means of suitable piping with the central chamber from which water is delivered to the upper water jacket and the lower water jacket through the aforesaid piping connection. These water jackets not only serve to cool that part of the cylinder liners situated in the common exhaust and air chambers, but also prevent combustion gases escaping past the outside of the liners. Suitable bearings are provided at the inner side and at the outer side of the cylinder casing and between the pair of cylinders. The caps of these bearings are retained in position by bolts and nuts, the said bolts passing right through the cylinder casing so that stresses are taken up by these bolts instead of by the cylinder casing. The rectangular cylinder casing for each pair of cylinder liners may be supported on suitable colums adapted to rest on a bed plate on which the crank shaft bearings are supported; or bolted in the case of horizontal engines to a common base plate with the crank shaft bearings. Where the engine is made in the form of a double unit, that is to say, two pairs of cylinders, the crank shaft is provided with two crank throws set at 90° apart, but it should be clearly understood that any desired multiple of one pair of cylinders may be suitably and efficiently used, the rocker arms of each pair of pistons being directly connected to the crank pins of the crank shaft in the manner as hereinbefore explained.

At the centre of each cylinder liner is arranged a casting which projects outside the cylinder casing and is adapted to carry the fuel injector and air starting valve. The aforesaid casting passes through a cover provided with a stuffing box on the cylinder casing which allows of the casting being bolted to the cylinder liner and also allows for expansion and access to the water jacket for cleaning purposes.

In a double unit engine, that is to say, in an engine construction where two pairs of cylinders are employed, the two units may be connected at their upper parts by a distance piece which may be formed as a tubular member provided with flanges and adapted to permit of the exhaust gases passing therethrough from the engine. The aforesaid distance piece of tubular form acts to compress and stiffen the whole engine while at the same time it may serve as a common exhaust to the exhaust chambers of the two units instead of each unit having a separate exhaust. The opening and closing of the spray or fuel valves and of the inlet and exhaust valves for the air starting, may be effected by cams placed on two cam shafts disposed on either side of the cylinder which shafts may be actuated from the crank shaft by helical or bevel gearing or through other suitable gearing.

An air compressor with an intercooler may be provided which may be mounted on the engine bed plate and driven from a crank on the crank shaft, but if solid injection is to be used the compressor hereinbefore referred to will obviously not be required.

For large two-cycle engines with cylinders of more than twelve inches in diameter water cooling can be easily adopted as there is little side stress on the pistons. The piston pin can be located nearer the open end of the piston thus allowing a water space to be formed in the closed end. The water can be led in and out by telescopic tubes for supply and waste water. The oiling of the pistons is preferably done by small reservoirs in ring form bolted to the inner and outer side of the cylinder casing which at the same time serve to keep the liners in place and to which oil is supplied under pressure at regular intervals coinciding with the time that the oil holes are covered by the pistons. The pistons are thereby supplied with oil through suitable holes drilled in the cylinder walls whilst the bottom pistons in the case of vertical engines dip in a reservoir formed in the bottom ring at the end of the stroke.

This construction as described offers the following advantages.

There can be only a single crank for each pair of cylinders.

Owing to the disposition of the connecting rods the exhaust ports if of even width as the inlet ports open in advance and close in advance of the inlet ports. Therefore the timing is very suitable for proper scavenging and super-charging without the need of auxiliary ports controlled by rotary or other distribution valves for the scavenging air.

The disposition of the connecting rods provides exceedingly favourable turning moments with absence of dead centres. The single crank shaft is simple and cheap and can be lubricated in the ordinary marine practice, as there is no constant downward pull. The castings are simple and light. The overall dimensions of the engine are small, the pairs of cylinders being placed in a direction rectangular to that of the crank shaft.

In order that the said invention may be clearly understood reference is made to the accompanying drawings, whereon:—

Figure 2 is a cross sectional elevation on the line 2—2, Figure 4, the left hand cylinder liner being shown in full elevation.

Figure 3 is an end view of Figure 1.

Figure 4 shows a sectional plan through Figure 1.

Figure 5 shows an example of a multiple unit construction.

Figure 6 shows the method of supplying cooling water to the trunk pistons and the method of lubricating the rocker bearings connecting rod small ends and wrist pins by oil under pressure supplied to the hollow rocker shaft.

Figure 7 shows the method of lubricating the pistons under pressure.

Figure 8 shows diagrammatically a general arrangement of an engine of the horizontal type also in accordance with the present invention, in which the long connecting rod is made in two parts each part being shown coupled to a crosshead common to both parts.

Figure 9 is an elevation of a reversing valve, and Figure 10 is a section thereof.

Figure 12:
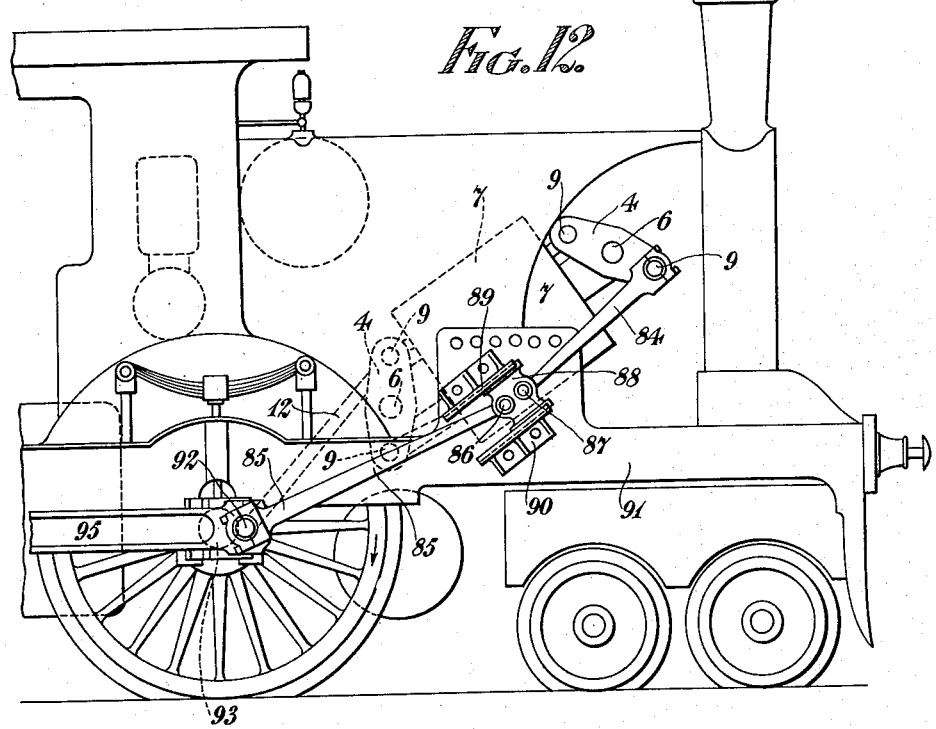
Figure 11:
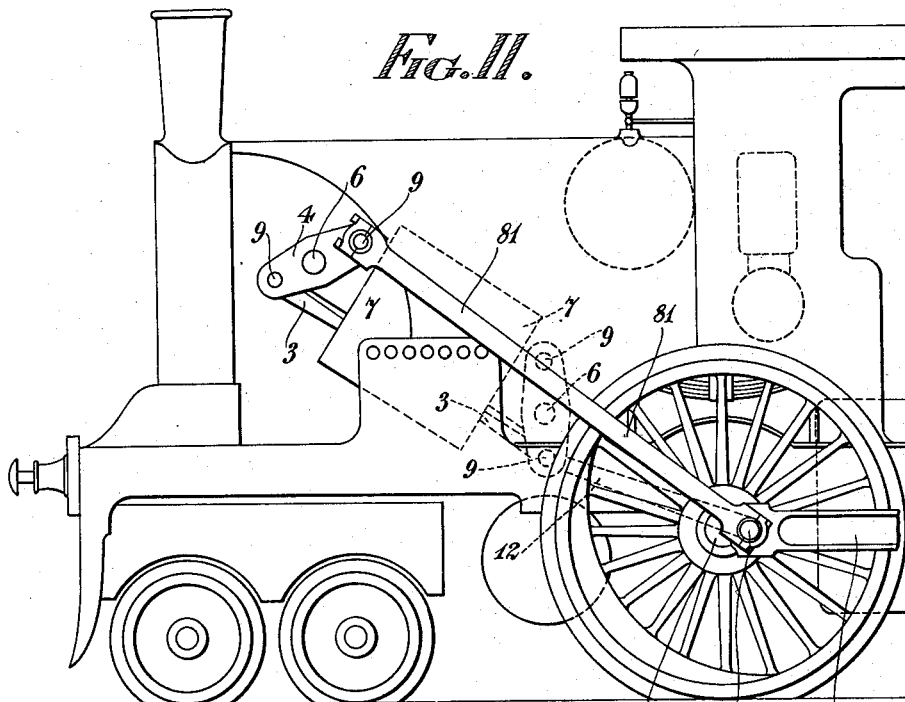

Figures 11 and 12 show two forms of general arrangement of the engine as applied to two different locomotives one with two driving wheels one wheel being shown as being driven by long connecting rods directly engaging crank pins in the driving wheels, the other locomotive also having two driving wheels which are driven by two part connecting rods engaging crank pins on cranks fixed to the end of the wheel axle.

Referring to the drawings the engine has two parallel and aligned cylinders 1 in which are arranged two pistons 2 connected by connecting rods 3 to rocker arms 4. These rocker arms which are preferably of steel are shown constructed on the marine principle, the said rocker arms being bolted or riveted to flanges 5, 5' respectively, turned on the shafts 6 and gudgeon pins 9, which shafts 6 turn in bearings 6' placed on either side of the main casting 7. The bearings 6' are interconnected by through-going bolts 8. The piston connecting rods 3 engage gudgeon pins 9.

The reciprocating movement of the two rocker arms 4 is transmitted to a double throw crank shaft 10 situated below the castings 7. The movement of the lower rocker arm 4 is transmitted from one of the gudgeon pins 9 direct to one of the crank pins 11 of crank shaft 10 by an ordinary marine type connecting rod 12. The movement of the top rocker arm 4 is transmitted to the same crank pin 11 of the same crank shaft 10 by means of two link rods 13, 14 engaging on extensions 15, 16 of one of the gudgeon pins 9. As shown the link rods 13, 14 are coupled by a steel yoke 17 to which two connecting rods 18, 19 with big ends are connected, the said big ends engaging the crank pin 11 on either side of the big end 20 of the connecting rod 12 which is coupled to the gudgeon pin of the lower rocker arm. The double big end of the long connecting rod can of course also be constructed at the end of the short connecting rod, a single big end being in that case fixed in or near the centre of the yoke member.

The cylinders 1 are formed as loose liners placed in a main casting 7 of rectangular form. The casting 7 is divided as shown into three compartments 21, 22, 23 the upper compartment 21 forming a common exhaust chamber for two laterally aligned cylinders, the centre compartment 22 forming a common water chamber for the same two cylinders and the lower compartment 23 forming a common air chamber for the said two cylinders.

Exhaust ports 24 and inlet ports 25 cut in the walls of the cylinder liners 1 communicate with the exhaust chamber 21 and air chamber 23. These ports can be of the shape as shown or they may consist of a number of small round holes of the same total port area as the total area of the form of ports shown. Air scavenging pumps 24' discharge direct through the pipe 25' and opening 26 into the common air chamber 23. The pumps 24' may be direct driven pumps as shown in the drawing or separately driven pumps; or if desired a rotary compressor. The parts of the lines 1, 1 inside the exhaust and air chambers 21, 23 respectively are surrounded by water jackets 27, 28 forming part of the main casting 7. These jackets communicate with the central water chamber 22 through outside connections 29 as shown; or in any other suitable manner, and effectively prevent any leakage past the outside of the liners of combustion gases.

In the centre of each liner a special casting 30 is bolted. In this casting are placed cages with the fuel and starter valves 31 and 32, Figure 4, similar to those in existing two-stroke engines. The aforesaid casting passes through a stuffing box 33 which forms part of a cover 34 bolted one on each side of the main casting 7. The cover 34 enables the casting 30 to be bolted to the liner 1 as shown and also allows for expansion of the liner.

The fuel and air starting valves 31, 32 are moved by cams 35, 36 mounted on cam shafts 37, 38 which are supported in bearings 39 on brackets 40 one on each side of the main casting 7. The cam shafts 37, 38 may be rotated by gear wheels, eccentrics or even chain drive or other suitable means as the power to be transmitted will be small.

The engine shown in Figures 1, 2, 3 and 4 is a double unit engine having a crank shaft with two crank throws set apart at 90° and therefore having the same torque as a four cylinder two-cycle oil engine. The engine as shown has extra wide bearings and crank pins and is nevertheless short in length. The drawing shows the main casting 7 supported on cast iron columns 41 on a common bed plate 42. The total absence of crosshead guides will be noted, all side stresses being taken up in the ample rocker bearings 6'.

The drawing also shows the common exhaust and air chambers 21, 23 of the two units connected by pipe lines 43, 44. The pipe line 43 Fig. 4 may serve as a common exhaust connection, while the pipe line 44 is shown connected to the double acting air pumps 24' by pipe 25' which thereby serve both units. At the same time the pipe lines 43 and 44 serve to stiffen the whole double unit.

Figure 5 shows a manner of building up a multiple unit engine. In this construction the base plate 42, crank shaft 10 and cam shafts 37, 38 are provided with flanges 45, 46, 47. The motor may be built up even in six or eight units but the double unit as shown has, in the case of a marine engine, ample manœuvring capacity for mercantile purposes.

Figure 1:
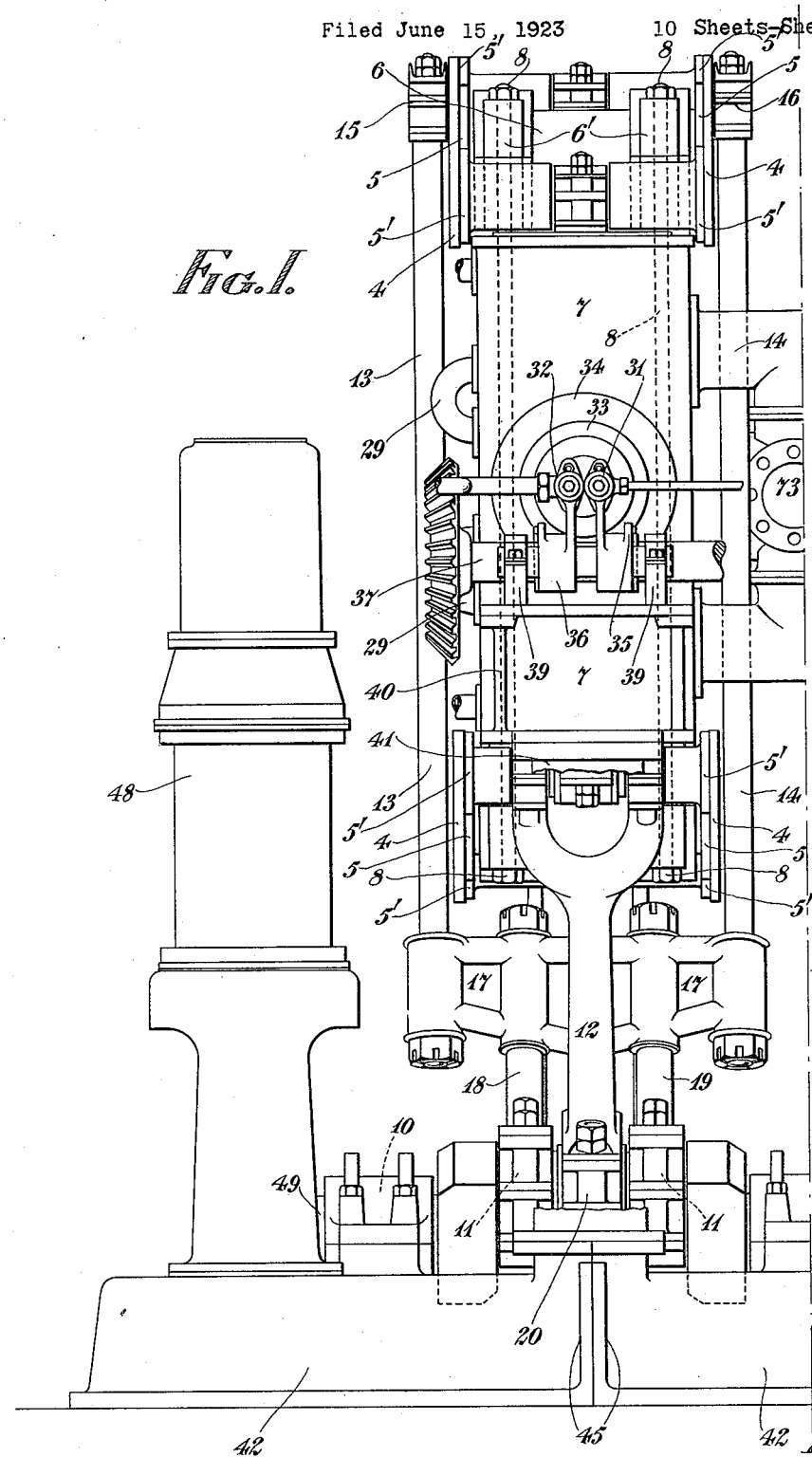
Figure 1 is a side elevation partly in section of a vertical construction of internal combustion engine embodying this invention and comprising two units.

Figure 1 shows a double stage intercooled compressor 48 driven from an extension 49 from the end of the crank shaft 10. If solid injection be used, the length of the engine will be considerably less, as the compressor 48 is then unnecessary.

Figure 6 shows in detail partly in section the water cooling arrangement for the pistons 2 and the lubrication of the rocker shafts 6, gudgeon pins 9 and pistons 2 Each trunk piston 2 can have the wrist pin 50 situated nearer the open end of the piston than is usual and a water space 51 is cast in the closed end of the piston. Pipes 52 are secured in the wall 53 of the water space and these pipes are adapted to slide through stuffing boxes 54 carried by a fixed tube 55 bolted to a bracket 56 secured on the cylinder casing. The pipes 52 serve for the supply and discharge of cooling water to the piston. Each piston has therefore two telescoping pipes.

The rocker shaft 6 is drilled and lubricant under pressure supplied to the hollow rocker shaft 6 through a pipe 57 which passes through a stuffing box 58 closing the end of the shaft 6. Small holes 59 lead to the outside of the shaft 6 to lubricate the rocker bearings while tubes 60 transfer the oil also to the hollow gudgeon pins 9. Small holes 61 connect the inside of the gudgeon pins 9 to the bearing surfaces of the piston connecting rods 3 and to the small ends of the main connecting rods 12, 13 and 14.

The piston connecting rods 3 are also provided with passages 62 to convey the oil under pressure to the piston wrist pins 50. A pump 63 Fig. 3 may be bolted to the outside of the casting 7 and it may be used to supply lubricant under pressure. 64 is the pump plunger which is connected as at 65 to the rocker arm 4 driven by the movement thereof. Figure 7 shows a detail of the method of lubricating the piston. Rings 66 are secured to the casting 7 so as to hold the cylinder liner 1 in place. Each ring 66 has a semi-circular oil groove 67 to which oil under pressure is supplied through the piping 68.

Holes 69 are drilled in the cylinder liner walls parallel to the axis and smaller holes 70 communicate with the holes 69 and the inside of the cylinder liner so that the pistons are lubricated when they cover the holes 70.

In the case of vertical engines, the bottom ring 71 may be provided with an oil reservoir 72 cast on into which the piston (not shown) dips at the end of its stroke.

73 is a reversing valve of any well known construction, the said valve being operated by a worm 74 and a worm wheel 75, the worm being driven by any suitable means or from the engine itself.

In Figure 8 the long connecting rod is shown as being formed in two parts 76, 77 coupled to a crosshead 78 common to both parts of the connecting rod. The crosshead 78 is reciprocated between guides 79, 80 integral with or rigidly secured to the cylinder casting 7.

In Figure 11, 81 is the long connecting rod which is connected to the crank pin 82 of the crank shaft 83 and 12 is the short connecting rod which is coupled to the same crank pin. Figure 12 shows the general arrangement of part of a locomotive in which the long connecting rod is formed in two parts 84, 85 which are connected to separate crosshead pins 86, 87 carried by a crosshead 88 common to both connecting rods. The short connecting rod is shown at 12. The crosshead 88 is reciprocated between guides 89, 90 which are secured to the engine frame 91. The part 85 of the long connecting rod is coupled to a crank pin 92 on a crank shaft 93. The crank pins 82 and 92 are coupled to the second pair of driving wheels by the rods 94 and 95 respectively The connecting rods may engage a separate shaft from which the movement is transmitted through gear wheels and connecting rods or other suitable means to the axle or axles of the driving wheels of the locomotive.

Assume that the engine is started and that the pistons are in the position shown in Figure 2, air having been admitted and compressed in the right hand cylinder and that fuel is admitted.

Ignition now takes place and drives the pistons 2 outwards. The movement of the lower piston 2 is transmitted direct to the crank 11, through the connecting rod 12 while the movement of the upper piston 2 is transmitted to the other end of the top rocker arm 4 which communicates a downward movement through the connecting rods 13, 14, the yoke 17 and the big ends 19 to the same crank 11, thus giving the crank shaft 10 a clockwise turning movement. Nearing the end of the stroke the upper piston 2 uncovers the exhaust ports 24 and the pressure in the cylinder drops immediately to about atmospheric pressure When the port 24 is fully three quarters uncovered the lower piston 2 opens the ports 25 and the scavenging air admitted through the ports 25 blows the cylinder clean from end to end.

On the inward stroke the exhaust ports are again closed ahead of the air ports 25 and, therefore, if the scavenging air is delivered under a certain pressure, this will be the initial pressure with which compression starts after the port 25 is closed by the lower piston.

In case the turning movement of the shaft 10 (Figure 2) should be anti-clockwise, the lower pistons will uncover and close the ports 25 in advance of the upper pistons opening and closing the ports 24.

In the case of reversing engines it will therefore be necessary to have an arrangement whereby the air and exhaust pipes can be connected to either the upper chamber or lower chamber. This can be done by a rotary four-way valve 73 as shown in Figures 9 and 10, or by a slide valve or other suitable means.

What I claim is:—

1. A reciprocating engine of the kind referred to, wherein the crank shaft is driven by connecting rods of unequal length which connect diagonally opposite ends of opposed rocker arms to a crank pin on a suitably disposed crank shaft.

2. A reciprocating engine of the kind referred to, wherein the crank shaft is driven by connecting rods of unequal length which connect diagonally opposed ends of opposed rockable arms to aligned crank pins on a suitably disposed crank shaft.

3. A reciprocating engine, wherein the crank shaft is driven by connecting rods of unequal length which connect diagonally opposite ends of opposed rockable arms to a crank pin on a suitably disposed crank shaft, having the longer connecting rods made in two parts, the parts being connected to guided crossheads common to both parts.

4. A reciprocating engine, wherein the crank shaft is driven by connecting rods of unequal length which connect diagonally opposite ends of opposed rockable arms to a crank pin on a suitably disposed crank shaft, comprising a pair of long connecting rods and a short connecting rod, the said connecting rods engaging the same crank pin, and the long connecting rods being formed in a plurality of parts rigidly interconnected by a yoke member common to both parts of the long connecting rods, the said yoke member being disposed with its lengthwise dimension approximately parallel to the axis of the crank shaft.

5. A reciprocating engine, wherein the crank shaft is driven by connecting rods of unequal length which connect diagonally opposite ends of opposed rockable arms to a crank pin on a suitably disposed crank shaft, comprising a pair of long connecting rods and a short connecting rod, the said connecting rods engaging the same crank pin, and the long connecting rods being formed in a plurality of parts flexib'y interconnected by means of a guided crosshead, the said yoke member being disposed with its lengthwise dimension approximately parallel to the axis of the crank shaft.

6. A reciprocating engine, wherein the crank shaft is driven by connecting rods of unequal length which connect diagonally opposite ends of opposed rockable arms to a crank pin on a suitably disposed crank shaft, comprising a pair of long connecting rods and a short connecting rod, the said connecting rods engaging aligned crank pins, and the long connecting rods being formed in a plurality of parts rigidly interconnected by a yoke member common to both parts of the long connecting rods, the said yoke member being disposed with its lengthwise dimension approximately parallel to the axis of the crank shaft.

7. A reciprocating engine, wherein the crank shaft is driven by connecting rods of unequal length which connect diagonally opposite ends of opposed rockable arms to a crank pin on a suitably disposed crank shaft, comprising a pair of long connecting rods and a short connecting rod, the said connecting rods engaging alined crank pins, and the long connecting rods being formed in a plurality of parts flexibly interconnected by means of a guided crosshead, the said yoke member being disposed with its lengthwise dimension approximately parallel to the axis of the crank shaft.

8. A reciprocating engine, wherein the crank shaft is driven by connecting rods of unequal length which connect diagonally opposite ends of opposed rockable arms to a crank pin on a suitably disposed crank shaft, in which bearings are provided on each side of the main cylinder casting to support the main shafts of the rockable arms, the said bearings being interconnected by through-going bolts.

In testimony whereof I have hereunto signed my name.

C. J. H. PENNING.